United States Patent
Ryon et al.

(10) Patent No.: US 11,852,076 B2
(45) Date of Patent: Dec. 26, 2023

(54) BRAZING USING LOCALIZED HEATING

(71) Applicant: Delavan Inc., West Des Moines, IA (US)

(72) Inventors: Jason Ryon, Carlisle, IA (US); Brandon P. Williams, Johnston, IA (US); Troy Finton, Phoenix, AZ (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/581,559

(22) Filed: Jan. 21, 2022

(65) Prior Publication Data

US 2023/0235703 A1  Jul. 27, 2023

(51) Int. Cl.
| | |
|---|---|
| F02C 7/22 | (2006.01) |
| B23K 1/00 | (2006.01) |
| B23K 1/005 | (2006.01) |
| F23D 14/48 | (2006.01) |
| B23K 101/00 | (2006.01) |

(52) U.S. Cl.
CPC ............ *F02C 7/222* (2013.01); *B23K 1/0018* (2013.01); *B23K 1/0056* (2013.01); *F23D 14/48* (2013.01); *B23K 2101/001* (2018.08); *F05D 2230/237* (2013.01); *F05D 2260/60* (2013.01)

(58) Field of Classification Search
CPC ..... F02C 7/222; B23K 1/0018; B23K 1/0056; F23D 14/48; F23R 3/28; F23R 3/283
See application file for complete search history.

(56) References Cited

U.S. PATENT DOCUMENTS

| | | | |
|---|---|---|---|
| 5,964,963 A | 10/1999 | Turchan et al. | |
| 6,092,363 A | 7/2000 | Ryan | |
| 9,296,038 B2 | 3/2016 | Krichever et al. | |
| 10,907,830 B2 * | 2/2021 | Wilson | F23R 3/005 |
| 11,098,900 B2 * | 8/2021 | Borror | F23R 3/283 |
| 2006/0218925 A1* | 10/2006 | Prociw | F23K 5/06 |
| | | | 60/740 |
| 2014/0356056 A1 | 12/2014 | Xie et al. | |
| 2016/0250725 A1 | 9/2016 | Henderkott et al. | |
| 2016/0298848 A1* | 10/2016 | Geary | F23R 3/286 |
| 2017/0110805 A1* | 4/2017 | Yoshida | B23K 1/0056 |
| 2019/0275617 A1* | 9/2019 | Bulgrin | F01D 9/044 |
| 2020/0033004 A1* | 1/2020 | Bunel | F23R 3/04 |
| 2022/0118539 A1* | 4/2022 | Oyama | B23K 1/206 |

FOREIGN PATENT DOCUMENTS

| | | | | |
|---|---|---|---|---|
| CN | 110425043 A | | 11/2019 | |
| DE | 102009019978 B4 * | | 8/2021 | F02C 7/222 |
| GB | 731609 A | | 6/1955 | |

OTHER PUBLICATIONS

Extended European Search Report dated Jun. 21, 2023, issued during the prosecution of European Patent Application No. EP23151025.6.

* cited by examiner

*Primary Examiner* — Craig Kim

(74) *Attorney, Agent, or Firm* — Locke Lord LLP; Joshua L. Jones; Scott D. Wofsy

(57) ABSTRACT

A method comprising applying braze to a joint location of two work pieces and applying local heating to the joint location of the two work pieces until braze melting temperature is achieved to melt the braze while maintaining temperature of more remote portions of each work piece. The method includes reducing heating of the braze to form a braze joint joining the joint location of the two work pieces.

17 Claims, 4 Drawing Sheets

Fig. 5
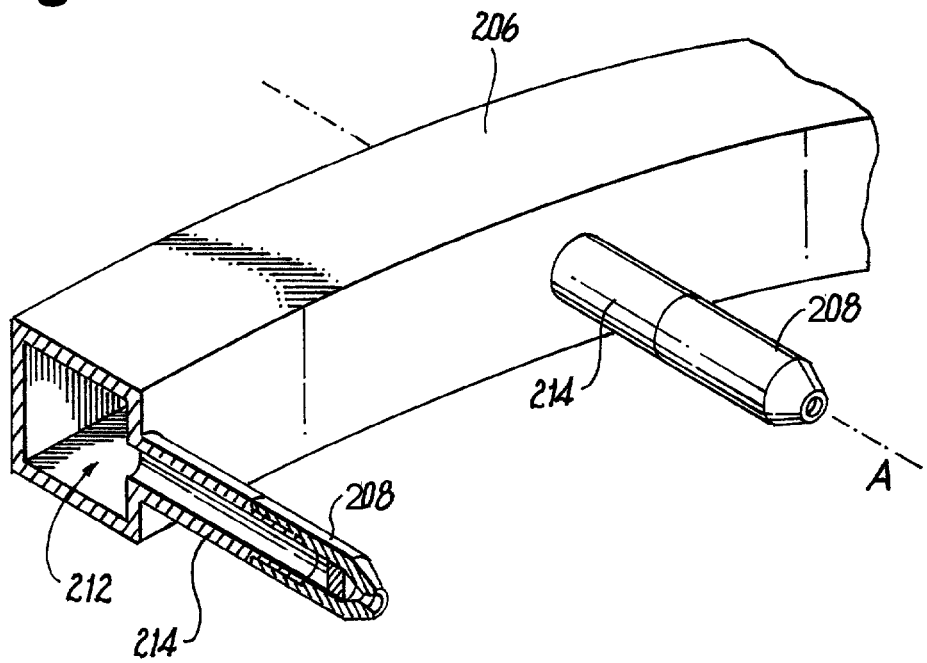
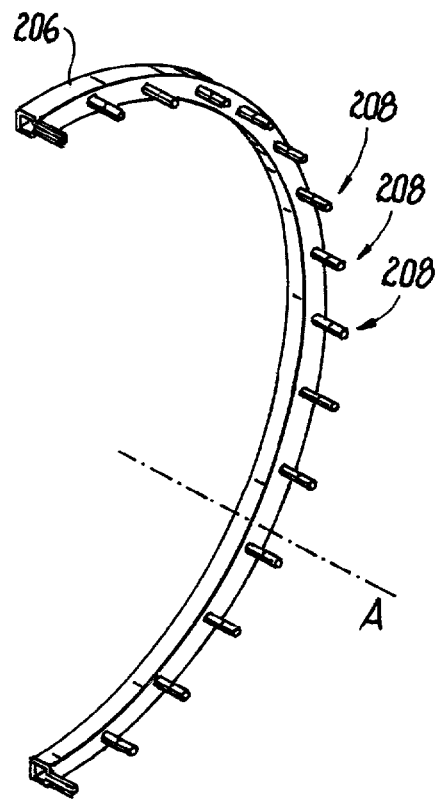
Fig. 6

BRAZING USING LOCALIZED HEATING

BACKGROUND

1. Field

The present disclosure relates to joining methods, and more particularly to joining methods such as used in joining fuel injectors and the like to fuel manifolds such as in gas turbine engines.

2. Description of Related Art

Brazing and welding are often used to join metallic components. Brazing involves two closely fitted parts and metal filler. The metal filler has a lower melting temperature than the work pieces, which allows it to be melted and fill the joint without melting the work pieces. Welding melts the parts together. Vacuum brazing involves heating the components in an oven (radiant or induction) to the desired temperatures, which can take considerable time to reach equilibrium. Other brazing types include melting a braze wire with lasers, heat tips, burners, and the like, as it is being applied between joints.

The conventional techniques have been considered satisfactory for their intended purpose. However, there has been an ongoing need for improved joining techniques. This disclosure provides a solution for this need.

SUMMARY

A method comprising applying braze to a joint location of two work pieces and applying local heating to the joint location of the two work pieces until braze melting temperature is achieved to melt the braze while maintaining temperature of more remote portions of each work piece. The method includes reducing heating of the braze to form a braze joint joining the joint location of the two work pieces.

Applying local heat can include using directing a directed heat source toward the joint location. The directed heat source can include at least one of a laser, electron beam, and/or focused microwave beam. Directing the directed heat source can include directing the directed heat source onto one or both of the two work pieces and/or onto the braze.

The method can include monitoring temperature of the joint location based on part temperature and/or power of the directed heat source. Directing the directed heat source can include directing the directed heat source to the joint location in a scan pattern and/or by rotating the two work pieces relative to the directed heat source. Directing the directed heat source can include directing the directed heat source through a hole in a component otherwise surrounding at least a portion of the joint location.

Applying braze can include pre-applying braze using a preform, plating, sintering, ring, and/or paste prior to applying local heating to the joint location. Both of the two work pieces can be metallic or one of the work pieces can be metallic and the other can be ceramic.

The method can include reducing input power to allow the braze joint to heat along a predetermined temperature profile for predetermined joint characteristics. Applying local heating can be performed in an inert environment or evacuated environment to prevent oxidation.

A first one of the two work pieces can be a fuel manifold. A second one of the two work pieces can be a fuel injection component. The method further includes applying braze to a respective joint location of at least one additional fuel injection component and the fuel manifold, applying local heating to the respective joint location of the at least one additional fuel injection component and the fuel manifold until braze melting temperature is achieved to melt the braze while maintaining temperature of more remote portions of the fuel manifold and the at least one additional fuel injection component, and reducing heating of the braze to form a respective braze joint without putting a whole assembly of the fuel manifold and fuel injection components through a braze cycle.

Joining the plurality of injection components can be performed for one injection component at a time. The fuel injection components can be pressure atomizing nozzles. The manifold and pressure atomizing nozzles can be positioned inside a high pressure case of a gas turbine engine and can be in fluid communication with a combustion space within a combustor that is inside the high pressure case. The manifold can be mounted to a gas turbine engine. Joining the plurality of injection components to the manifold can be performed in situ on the gas turbine engine. For at least one of the injection components, the method can include cutting the injection component free from the manifold, and dressing the manifold for repair and/or replacement of the at least one injection component.

A system includes a fuel manifold. A plurality of fuel injection components are connected in fluid communication with the fuel manifold with a respective braze joint sealing between each of the plurality of fuel injection components and the fuel manifold to prevent leakage from between the manifold and the plurality of fuel injection components. The fuel manifold defines a main fuel plenum. Each of the plurality of fuel injection components is connected in fluid communication with the main fuel plenum along a respective fuel path that is devoid of o-ring seals.

The fuel injection components can be pressure atomizing nozzles, wherein the manifold and pressure atomizing nozzles are positioned inside a high pressure case of a gas turbine engine and are in fluid communication with a combustion space within a combustor that is inside the high pressure case. The fuel injection components can be fuel injectors, each including a feed arm and air blast nozzle extending from the feed arm, wherein the feed arm is where the fuel injector is joined to the manifold, wherein the fuel manifold is outside of a high pressure case of a gas turbine engine, wherein the air blast nozzles are inside the high pressure case, and wherein the air blast nozzles are in fluid communication with a combustion space within a combustor that is inside the high pressure case.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 5 is a schematic cross sectional perspective view of the system of another embodiment of a system in accordance with the present disclosure, showing a pressure atomizer nozzle mounted to a fuel manifold that can be located inside a high pressure engine case; and FIG. 6 is a schematic cross-sectional perspective view of the system of FIG. 5, showing a plurality of pressure atomizer nozzles.

DETAILED DESCRIPTION OF THE PREFERRED EMBODIMENTS

Figure 1:
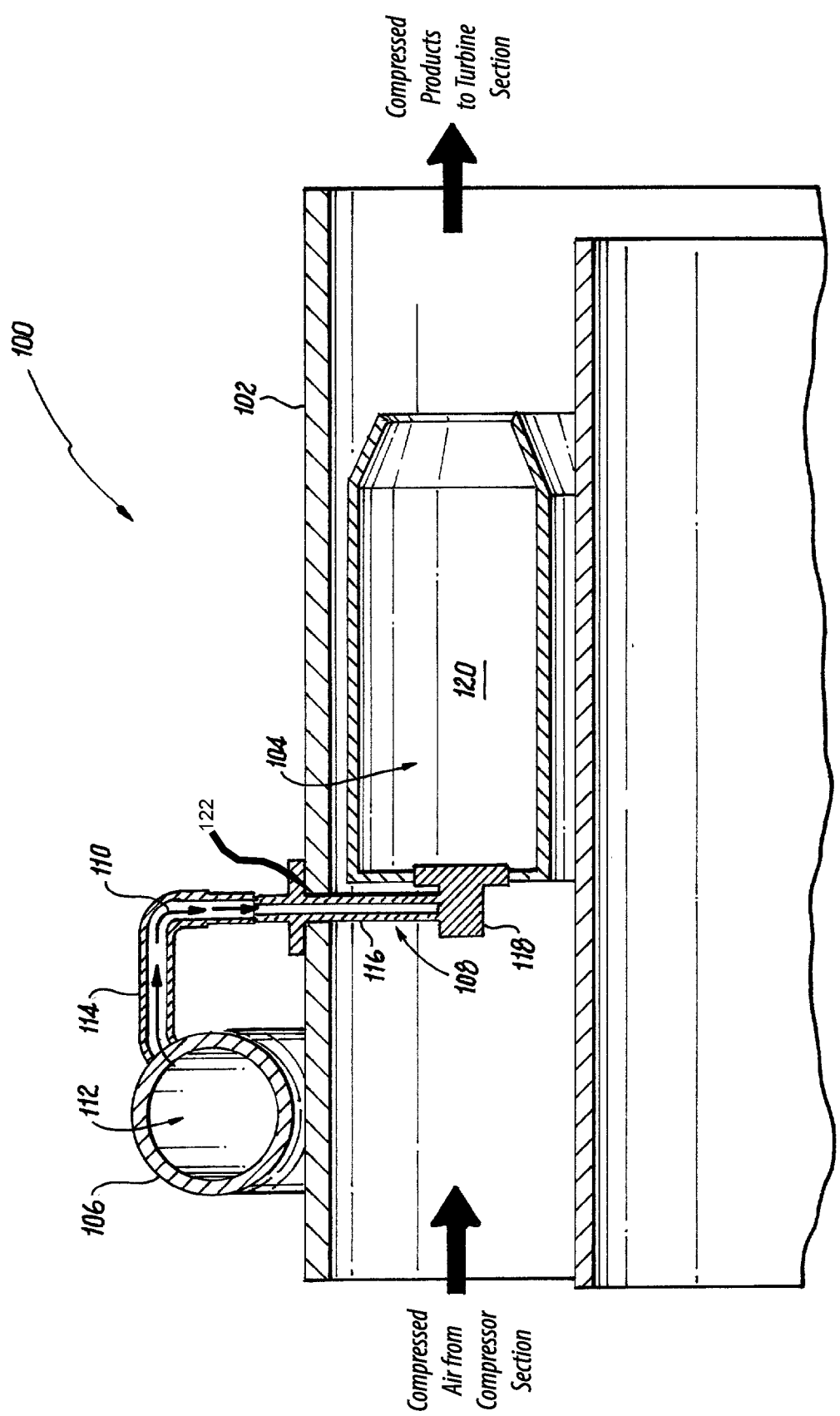
FIG. 1 is a schematic cross-sectional side elevation view of an embodiment of a system constructed in accordance with the present disclosure, showing a manifold and an injector mounted in a gas turbine engine high pressure case and combustor liner.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to connect fuel nozzles and injectors to manifolds without the need for o-ring seals or the like, allowing for higher fuel temperatures than in more traditional systems.

The system 100 includes a high pressure engine case 102 of a gas turbine engine including a compressor section (not pictured in FIG. 1, but indicated by the flow arrow for compressed air flowing in from the compressor section), a combustor 104 in fluid commination to receive the compressed air from the compressor section, and a turbine section (not pictured in FIG. 1, but indicated by the flow arrow for combustion products flowing from the combustor 104 to the turbine section). A fuel manifold 106 is included for supplying fuel for combustion with the compressed air in the combustor 104. A plurality of fuel injection components 108 are connected in fluid communication with the fuel manifold 106 with metallic joints 110 sealing between each of the plurality of fuel injection components 108 and the fuel manifold 106 to prevent leakage from between the manifold 106 and the plurality of fuel injection components 108. Those skilled in the art will readily appreciate that while only one fuel injection component 108 is shown in the cross-section of FIG. 1, the plurality of fuel injection components 108 are distributed circumferentially around the annular space defined by the cross-section in FIG. 1, see, e.g. FIGS. 5-6 below with their circumferential distribution of fuel injection components 208.

The fuel manifold 106 defines a main fuel plenum 112. Each of the plurality of fuel injection components is connected in fluid communication with the main fuel plenum 112 along a respective fuel path that is devoid of o-ring seals or other polymeric seals, where the flow path passes from the plenum 112, through a respective manifold tube 114, and into the respective fuel injection component 108 as indicated in FIG. 1 by the flow arrows. The metallic joints 110 are braze joints joining each manifold tube 114 to its respective fuel injection component 108.

The fuel injection components 108 are fuel injectors, each including a feed arm 116 and air blast nozzle 118 extending from the feed arm 116. The feed arm 116 is where the fuel injector is joined to the manifold 106, i.e. an inlet end of each feed arm 116 is joined at the metallic joint 110 to a respective one of the manifold tubes 114. The fuel manifold 106 is outside of the high pressure case 102, but the air blast nozzles 118 are inside the high pressure case 102. The air blast nozzles 118 are in fluid communication with combustion space 120 within the combustor 104, which is inside the high pressure case 102. The air blast nozzles 118 are configured to atomize fuel from the manifold 106 in a flow of compressor discharge air for combustion in the combustion space 120. A mounting flange 122 extends from the feed arm 116 of each fuel injector, for mounting the feed arm 116 to the high pressure engine case 102, and the feed arm 116 and its internal flow passage pass through the high pressure engine case 102 and through the mounting flange 122.

Figure 2:
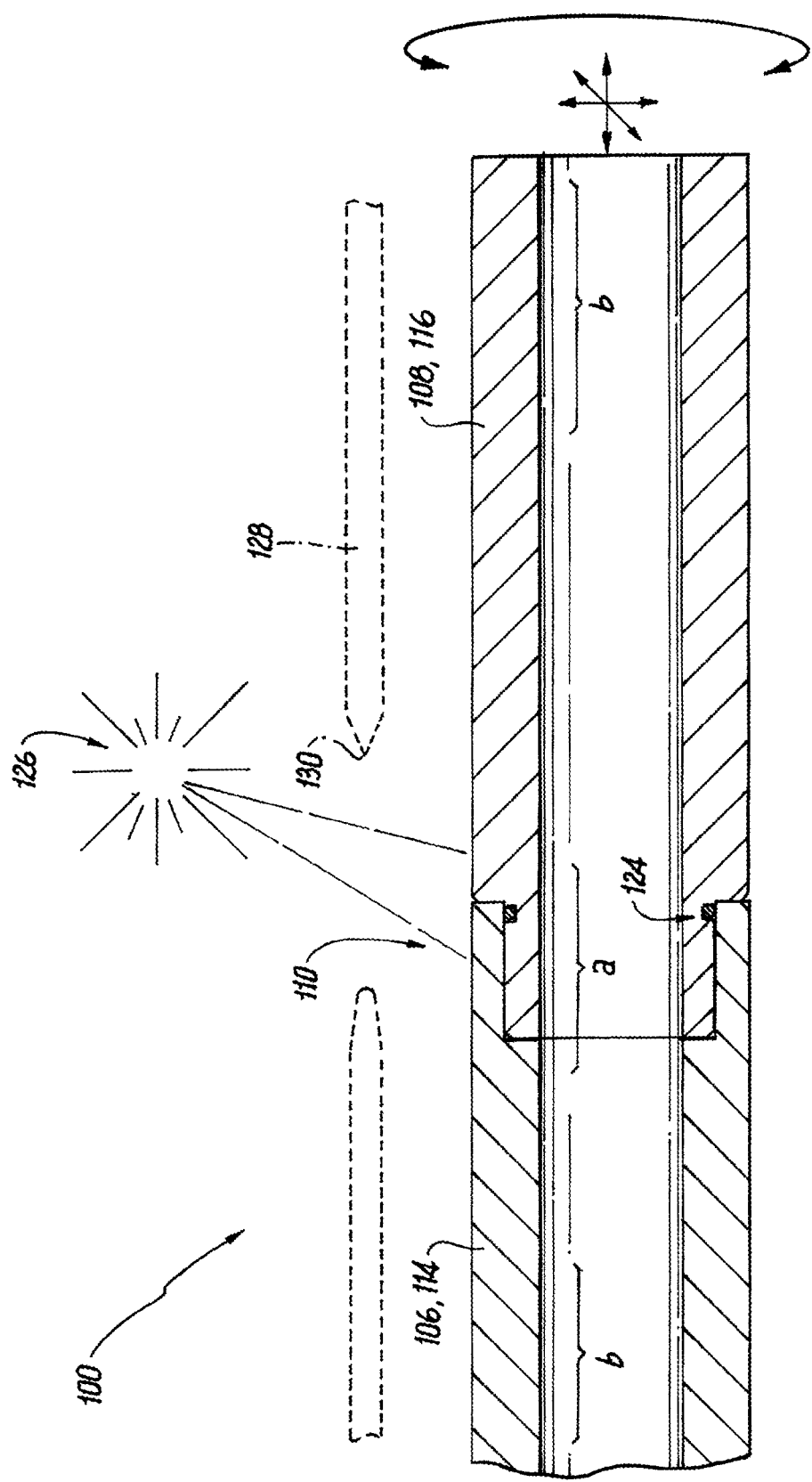
FIG. 2 is a schematic cross-sectional side elevation view of one of the braze joints of FIG. 1, showing the local heating schematically.

With reference now to FIG. 2, a method includes applying braze, e.g. braze ring 124, to a joint location, e.g. joint location 110, of two work pieces, e.g. the fuel tube 114 of the manifold 106 of FIG. 1 and the feed arm 116 of the fuel injector 108 of FIG. 1. The method includes applying local heating to the joint location of the two work pieces until braze melting temperature is achieved to melt the braze while maintaining temperature of more remote portions of each work piece. In FIG. 2, this local heating is indicated by the area a, whereas the portions of the components 114, 116 on the left and right ends of FIG. 2 indicated as areas b may remain effectively unheated and unchanged in temperature to the point that their material properties are not changed during the local heating in area a. The method includes reducing the heating thereby allowing the braze to lower in temperature back down to ambient, to form a braze joint joining the joint location of the two work pieces.

While the braze in FIG. 2 is shown as a ring, applying braze can include pre-applying braze using a preform, plating, sintering, ring, and/or paste prior to applying local heating to the joint location. Both of the two work pieces can be metallic or one of the work pieces can be metallic and the other can be ceramic.

Figure 3:
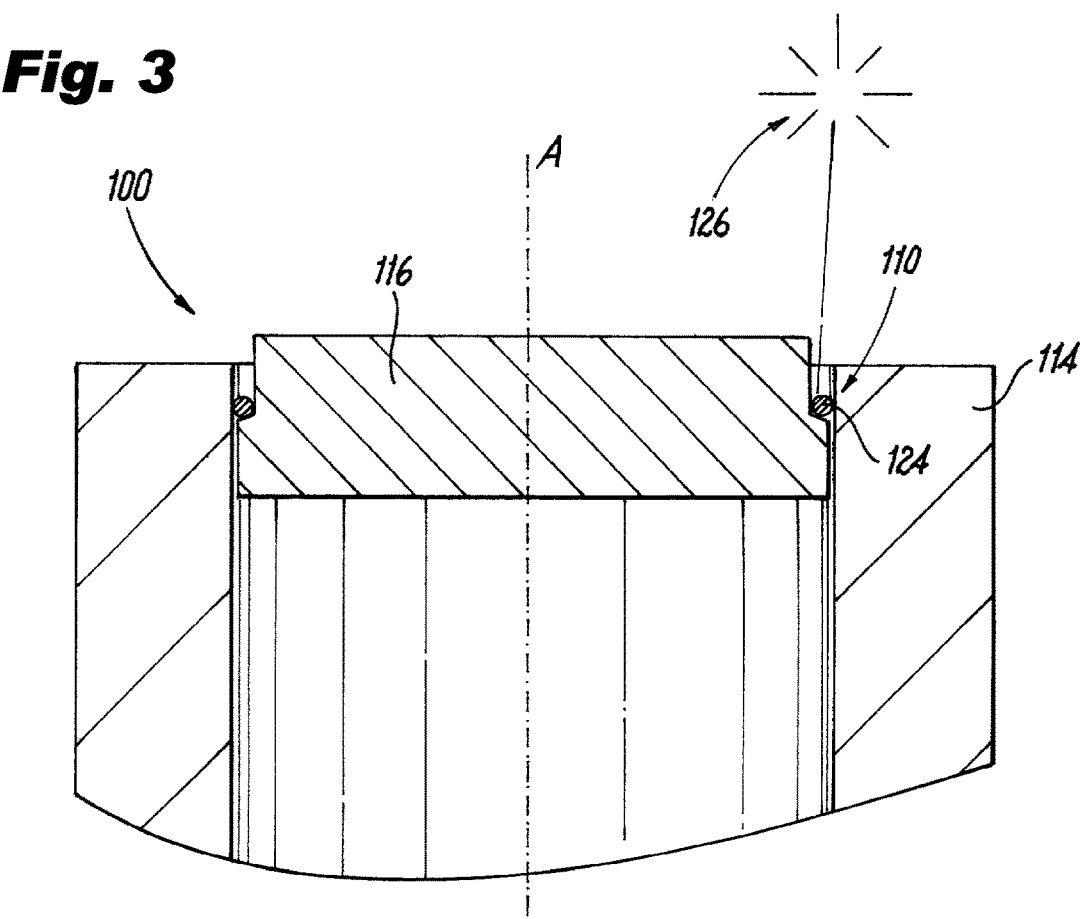
FIG. 3 is a schematic cross-sectional side elevation view of a variant of the braze joint of FIG. 2, showing an axial line of site into the braze ring for local heating.
Figure 4:
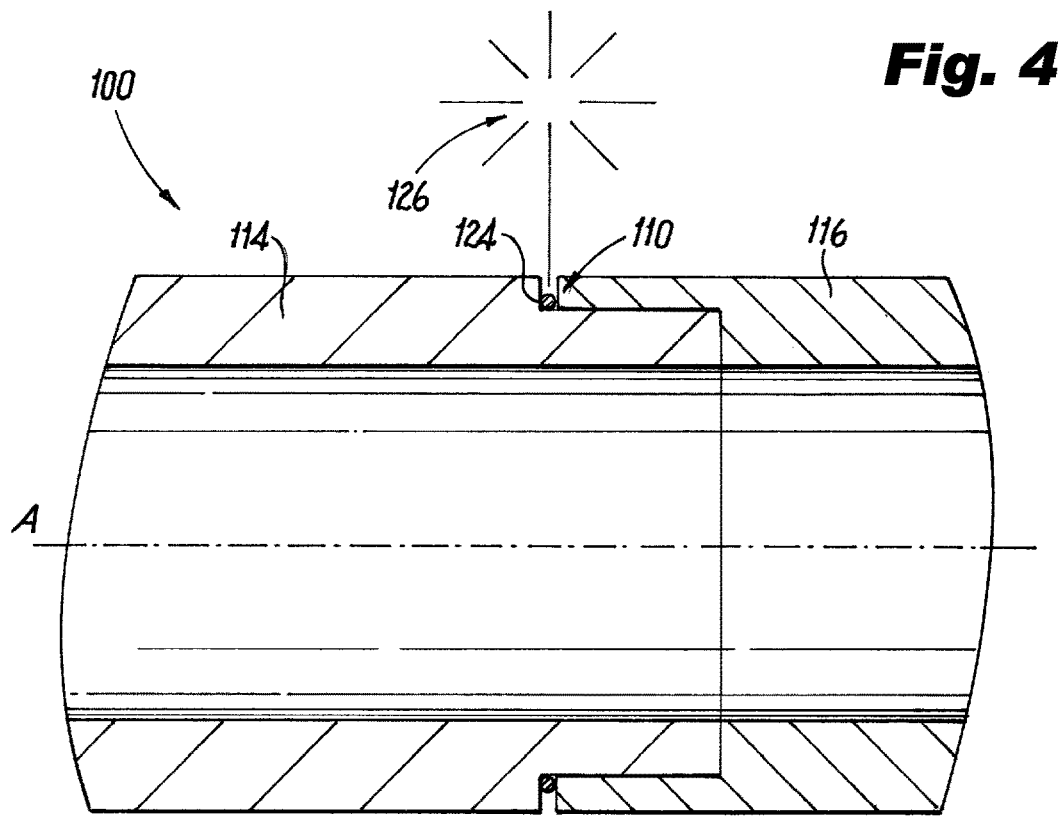
FIG. 4 is a schematic cross-sectional side elevation view of another variant of the braze joint of FIG. 2, showing a radial line of site into the braze ring for local heating.

Applying local heat includes using directing a directed heat source, e.g. directed heat source 126, toward the joint location. The directed heat source can include a laser, electron beam, focused microwave beam, and/or the like. Directing the directed heat source includes directing the directed heat source onto one or both of the two work pieces, as indicated by the scan lines emanating from the directed heat source 126 in FIG. 2. It is also contemplated that the geometry of the joint location 110 can be such that a direct line of sight is possible to directly heat the braze with the directed source. In FIG. 3, an example is shown where the line of sight is along an axial direction A relative to the components 114, 116, as indicated by the scan line in FIG. 3, and into a pocket where the braze ring 124 can be heated directly by the directed heat source 126. In FIG. 4, an example is shown where the line of sight is along a radial direction perpendicular to the axial direction A, as indicated by the scan line in FIG. 4, and into a pocket where the braze ring 124 can be heated directly by the directed heat source 126.

Referring again to FIG. 2, the method can include monitoring temperature of the joint location 110 based on part temperature and/or power of the directed heat source 126 for temperature control of the directed heat source 126. Directing the directed heat source 126 can include directing the directed heat source to the joint location in a scan pattern, as indicated by the two scan lines in FIG. 2, and/or by rotating the two work pieces 116, 114 relative to the directed heat source, as indicated by the circular arrow in FIG. 2. Those skilled in the art will readily appreciate that any suitable heating pattern can be used to direct the directed heat source 126, which can be a point source, a defocused point, a pulsed beam, scan pattern over the braze joint area, or the work piece can translated (as indicated by the 3 orthogonal arrows in FIG. 2) or rotated to spread the energy evenly into the desired local heating zone. Directing the directed heat source can include directing the directed heat source through a hole in a component that otherwise surrounds at least a portion of the joint location, such as a through the hole 130 in the optional heat shield 128 around the fuel injection component 108, 116 and/or fuel manifold 106, 114 as indicated in broken lines in FIG. 2.

The method can include reducing input power during brazing by using de-focus, pattern, pulse time, scan time, reducing emitter power, or the like to allow the braze joint to heat along a predetermined temperature profile for predetermined joint characteristics. The local heating can be performed in an inert environment, such as argon or an evacuated, e.g. vacuum, environment to prevent oxidation if needed.

Local heating can be repeated for all of the fuel injection components 108, 116 being joined to the fuel manifold 106, 114 without putting a whole assembly of the fuel manifold and fuel injection components through a braze cycle, e.g. without having to fit the whole assembly into an oven for brazing. Joining the plurality of injection components can be performed for one injection component at a time. The manifold 106 can be mounted to a gas turbine engine as shown in FIG. 1, and joining the plurality of injection components to the manifold can performed in situ on the gas turbine engine. If it is needed, the injection component 106, 116 can be cut free from the manifold, and the manifold can be dressed for repair and/or replacement of the at least one injection component.

With reference now to FIGS. 5-6, a fuel manifold 206 is shown having a fuel plenum 212 similar to manifold 106 above. However, in the case of manifold 206, the fuel injection components 208 are pressure atomizing nozzles, joined to the manifold 206 using techniques as described above. The respective manifold tubes 214 extend in an axial direction A from the fuel plenum 212 to each respective fuel injection component 208. This manifold configuration can allow for the manifold 206 and pressure atomizing nozzles 208 to be positioned inside the high pressure case 102 shown in FIG. 1, and in fluid communication with the combustion space 120, shown in FIG. 1, that is inside the high pressure case 102. It is also contemplated that the pressure atomizing nozzles 208 could instead be air blast nozzles, or that the air blast nozzles 108 of FIG. 1 could be replaced with pressure atomizing nozzles where the manifold 106 itself is outside of the high pressure case 102.

Those skilled in the art will readily appreciate that although described herein in the exemplary context of fuel injection components and fuel manifolds, brazing techniques as disclosed herein can be applied to any suitable pair of components without departing from the scope of this disclosure. The components can have joints are closely fitted, i.e. standard braze fitting joints.

There are various potential advantages to systems and methods as disclosed herein, such as the following. Local heating does not alter material properties of the two work pieces remote from the joint location. Quicker braze times are possible since it is not necessary to wait for an entire oven and all components to heat up and heat down. The brazing methods herein can be performed on individual work pieces, e.g. to reduce batch failures, or on multiple simultaneous workpieces, e.g. by scanning a directed source such as a laser over an entire batch. The localized heating is done away from installed heat sensitive components such as o-rings, springs, electronic components, or the like. Systems and methods as disclosed herein do not require moving parts during processing, as with braze deposition methods, although sometimes it can be advantageous to rotate parts for even joint heating. Laser power (or other directed energy source power) and/or part temperature can be monitored during processing for quality and statistical monitoring. Braze will not tend to run as the heat is localized, which reduces the need for stop-off application. Local heat is applied directly to the joint location without overheating the work pieces, but enough heat is added that the pre-applied braze material can melt to form a good joint. This can allow the exact or near exact amount of braze to be positioned within the work pieces, and the braze may be buried and not accessible to external braze applications.

The methods and systems of the present disclosure, as described above and shown in the drawings, provide for connecting fuel nozzles and injectors to manifolds without the need for o-ring seals or the like, allowing for higher fuel temperatures than in more traditional systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
applying braze to a joint location of two work pieces;
applying local heating to the joint location of the two work pieces until braze melting temperature is achieved to melt the braze while maintaining temperature of more remote portions of each work piece; and
reducing heating of the braze to form a braze joint joining the joint location of the two work pieces, wherein a first one of the two work pieces is a fuel manifold, wherein a second one of the two work pieces is a fuel injection component, wherein the manifold is mounted to a gas turbine engine, and wherein joining the joint location of the fuel injection component to the manifold is performed in situ on the gas turbine engine.

2. The method as recited in claim 1, wherein applying local heat includes using directing a directed heat source toward the joint location.

3. The method as recited in claim 2, wherein the directed heat source includes at least one of a laser, electron beam, and/or focused microwave beam.

4. The method as recited in claim 2, wherein directing the directed heat source includes directing the directed heat source onto one or both of the two work pieces and/or onto the braze.

5. The method as recited in claim 2, further comprising monitoring temperature of the joint location based on part temperature and/or power of the directed heat source.

6. The method as recited in claim 2, wherein directing the directed heat source includes directing the directed heat source to the joint location in a scan pattern and/or by rotating the two work pieces relative to the directed heat source.

7. The method as recited in claim 2, wherein directing the directed heat source includes directing the directed heat source through a hole in a component otherwise surrounding at least a portion of the joint location.

8. The method as recited in claim 1, wherein applying braze includes pre-applying braze using a preform, plating, sintering, ring, and/or paste prior to applying local heating to the joint location.

9. The method as recited in claim 1, wherein both of the two work pieces are metallic or wherein one of the work pieces is metallic and the other is ceramic.

10. The method as recited in claim 1, further comprising: reducing input power to allow the braze joint to heat along a predetermined temperature profile for predetermined joint characteristics.

11. The method as recited in claim 1, wherein applying local heating is performed in an inert environment or evacuated environment to prevent oxidation.

12. The method as recited in claim 1, wherein the method further comprises:
   applying braze to a respective joint location of at least one additional fuel injection component and the fuel manifold;
   applying local heating to the respective joint location of the at least one additional fuel injection component and the fuel manifold until braze melting temperature is achieved to melt the braze while maintaining temperature of more remote portions of the fuel manifold and the at least one additional fuel injection component; and
   reducing heating of the braze to form a respective braze joint without putting a whole assembly of the fuel manifold and fuel injection components through a braze cycle.

13. The method as recited in claim 12, wherein joining the plurality of injection components is performed for one injection component at a time.

14. The method as recited in claim 12, wherein the fuel injection components are pressure atomizing nozzles.

15. The method as recited in claim 14, wherein the manifold and pressure atomizing nozzles are positioned inside a high pressure case of a gas turbine engine and are in fluid communication with a combustion space within a combustor that is inside the high pressure case.

16. The method as recited in claim 12, wherein joining the plurality of injection components to the manifold is performed in situ on the gas turbine engine.

17. The method as recited in claim 12, further comprising for at least one of the injection components, cutting the injection component free from the manifold, and dressing the manifold for repair and/or replacement of the at least one injection component.

* * * * *